United States Patent
Sagesaka et al.

(10) Patent No.: US 10,974,461 B2
(45) Date of Patent: Apr. 13, 2021

(54) RESIN MOLDED PRODUCT AND WELDING APPARATUS

(71) Applicant: KOITO MANUFACTURING CO., LTD., Tokyo (JP)

(72) Inventors: Yuji Sagesaka, Shizuoka (JP); Masakazu Sato, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 357 days.

(21) Appl. No.: 15/486,022

(22) Filed: Apr. 12, 2017

(65) Prior Publication Data

US 2017/0291353 A1    Oct. 12, 2017

(30) Foreign Application Priority Data

Apr. 12, 2016   (JP) .............................. JP2016-079387

(51) Int. Cl.
  *B29C 65/16*        (2006.01)
  *F21S 43/30*        (2018.01)
  (Continued)

(52) U.S. Cl.
  CPC ...... *B29C 65/1629* (2013.01); *B29C 65/1635* (2013.01); *B29C 65/1658* (2013.01); *B29C 65/1661* (2013.01); *B29C 65/1667* (2013.01); *B29C 66/112* (2013.01); *B29C 66/114* (2013.01); *B29C 66/116* (2013.01); *B29C 66/118* (2013.01); *B29C 66/1142* (2013.01); *B29C 66/301* (2013.01); *B29C 66/3452* (2013.01); *B29C 66/73365* (2013.01); *B60Q 1/0058* (2013.01); *B60Q 1/22* (2013.01);
  (Continued)

(58) Field of Classification Search
  CPC . A47C 31/113; B29C 65/1629; B29C 66/301; B29C 66/73365; B60Q 1/22; B60Q 1/34; B60Q 1/44
  See application file for complete search history.

(56) References Cited

U.S. PATENT DOCUMENTS

2005/0030751 A1    2/2005  Matsunaga et al.
2005/0266762 A1*  12/2005  Yasuda ............... B29C 65/1654
                                                                   445/23
(Continued)

FOREIGN PATENT DOCUMENTS

CN       104943158 B    10/2018
JP       2005-339873 A  12/2005
(Continued)

OTHER PUBLICATIONS

Preliminary Search Report issued in French Application No. 1753205, dated Feb. 4, 2019 (12 pages).
(Continued)

*Primary Examiner* — Samir Shah
*Assistant Examiner* — Tong Guo
(74) *Attorney, Agent, or Firm* — Osha Bergman Watanabe & Burton LLP

(57) ABSTRACT

There is provided a resin molded product including a first member and a second member which are laser welded. A laser welded portion includes a first welding portion which is welded by laser welding of galvano method and a second welding portion which is welded by laser welding of flash method or laser welding of scanning method.

7 Claims, 7 Drawing Sheets

(51) Int. Cl.
    *B29C 65/00*     (2006.01)
    *F21S 43/14*     (2018.01)
    *F21S 43/237*     (2018.01)
    *B60Q 1/26*     (2006.01)
    *F21S 43/27*     (2018.01)
    *B60Q 1/00*     (2006.01)
    *B60Q 1/22*     (2006.01)
    *B60Q 1/34*     (2006.01)
    *B60Q 1/44*     (2006.01)
    *B29C 65/82*     (2006.01)
    *F21S 43/20*     (2018.01)
    *B29L 31/30*     (2006.01)
    *B29L 31/00*     (2006.01)

(52) U.S. Cl.
    CPC ............. *B60Q 1/2607* (2013.01); *B60Q 1/34* (2013.01); *B60Q 1/44* (2013.01); *F21S 43/14* (2018.01); *F21S 43/237* (2018.01); *F21S 43/27* (2018.01); *F21S 43/30* (2018.01); *B29C 65/8253* (2013.01); *B29K 2995/0026* (2013.01); *B29L 2031/30* (2013.01); *B29L 2031/747* (2013.01); *F21S 43/26* (2018.01)

(56) References Cited

U.S. PATENT DOCUMENTS

| | | | |
|---|---|---|---|
| 2006/0163214 A1* | 7/2006 | Yamazaki | B29C 65/1635 219/121.6 |
| 2007/0295719 A1* | 12/2007 | Yamazaki | B29C 65/1635 220/4.01 |
| 2010/0301522 A1 | 12/2010 | Hokoda et al. | |
| 2011/0298160 A1 | 12/2011 | Zaitsu et al. | |
| 2015/0276159 A1 | 10/2015 | Boero et al. | |

FOREIGN PATENT DOCUMENTS

| | | |
|---|---|---|
| JP | 2011-102029 A | 5/2011 |
| JP | 2011-255575 A | 12/2011 |
| JP | 2013-022922 A | 2/2013 |

OTHER PUBLICATIONS

Office Action issued in Chinese Application No. 201710235724.8, dated Jan. 21, 2019 (17 pages).

\* cited by examiner

RESIN MOLDED PRODUCT AND WELDING APPARATUS

CROSS-REFERENCE TO RELATED APPLICATIONS

The present application claims the benefit of priority of Japanese Patent Application No. 2016-079387, filed on Apr. 12, 2016, the content of which is incorporated herein by reference.

TECHNICAL FIELD

The present invention relates to a resin molded product welded by projecting laser beams and a welding apparatus for welding a resin molded product with high reliability.

BACKGROUND

There has been proposed a laser welding technique of projecting laser beams to form a resin molded product. A lamp housing, as an example of the resin molded product, has a resin lamp body and a resin front cover which are laser welded along a periphery of an opening of the lamp body. In this case, a laser welding of scanning method, galvano method or flash method may be used as described in JP-A-2005-339873. The scanning method is a technique of moving a laser head which emits laser beams along a welding portion to perform welding. The galvano method is a technique of deflecting (changes the irradiation direction) the light from a stationary laser head by a movable mirror or the like to project the light onto a welding portion. The flash method is a technique of projecting laser beams from each of a plurality of laser heads arranged along a welding surface onto a welding portion respectively.

The scanning method takes time for the laser head to move across the entire welding portion, so that it is difficult to make the welding portion be in a melting state simultaneously when the welding portion is large or long. Therefore, the scanning method may not be suitable for welding a large lamp. The flash method does not cause such problems in the scanning method or the galvano method but needs a plurality of or a large number of laser heads to be disposed along the length direction of the welding portion, which increases the cost of the welding apparatus. The galvano method can quickly and simultaneously melt the welding portion but is difficult to perform welding with high reliability when there is a portion onto which laser beams cannot be projected at a small incident angle due to the three-dimensional shape of the welding portion. JP-A-2011-255575 solves this problem in the galvano method by using a plurality of laser heads to weld different areas of the welding surface.

SUMMARY

In the lamp housing of the above examples, there has been proposed a three-dimensional lamp whose front cover is not point symmetrical with a lamp optical axis according to design requirement. In such lamp, in order to weld the front cover and the lamp body, leg portions is provided to stand on an edge of the front cover and has different heights along a circumferential direction of the edge. In this case, it is difficult to perform laser welding along the entire edge of the front cover using one galvano head.

Therefore, as described JP-A-2011-255575, it is conceivable of using different galvano heads to weld the leg portions with different heights. However, it is difficult to obtain the light intensity necessary for welding since the projected laser beams are absorbed when passing through the leg portions in a height direction if laser beams are projected onto the leg portion with higher height. Further, in the laser welding with a plurality of galvano heads, it is necessary to control projection timings of laser beams of each galvano head in order to suitably manage all leg portions in a melted state, which would make the control complicated. If the projection timings of the plurality of galvano heads are not suitable, the welding quality of the leg portions with different heights tends to be different from each other, which causes a low welding quality of the entire lamp.

Accordingly, an aspect of the present invention provides a resin molded product with high welding quality and a welding apparatus for welding the same.

An illustrative embodiment of the present invention provides a resin molded product comprising a first member and a second member which are laser welded. A laser welded portion includes a first welding portion which is welded by laser welding of galvano method and a second welding portion which is welded by laser welding of flash method or laser welding of scanning method.

In the above configuration, the second member may be a translucent member and include leg portions with different heights welded with respect to the first member. The first welding portion may be provided on the leg portion with lower height, and the second welding portion may be provided on the leg portion with higher height.

In the above configuration, the first member may be a lamp body, the second member may be a translucent front cover welded to an opening of the lamp body, and leg portions provided on a periphery of the front cover may be welded to the lamp body. The welding portion between the lamp body and the front cover may include the first welding portion which is welded by the laser welding of galvano method and the second welding portion which is welded by the laser welding of flash method or the laser welding of scanning method.

According to another illustrative embodiment, there is provided a welding apparatus for laser welding a first member and a second member at a first welding portion and a second welding portion. The welding apparatus includes a galvano laser projection unit configured to weld the first welding portion by laser welding of galvano method, and one of a flash laser projection unit configured to weld the second welding portion by laser welding of flash method and a scanning laser projection unit configured to weld the second welding portion by laser welding of scanning method.

According to the above configuration, a resin molded product can be obtained which includes a welding portion with high-quality which is welded by laser welding of galvano method and a welding portion with high quality which is welded by laser welding of flash method or scanning method.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Figure 1:
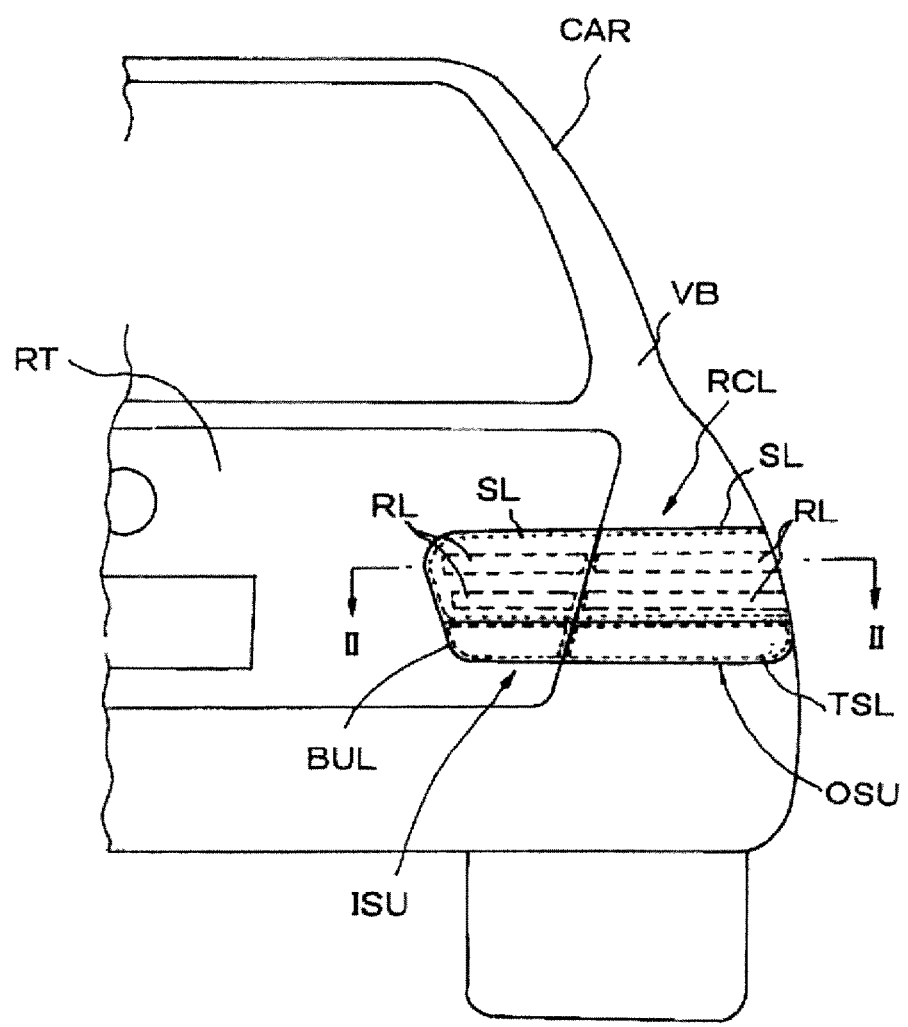
FIG. 1 is a rear view of a right rear portion of an automobile according to an illustrative embodiment in which the present invention is applied to a combination lamp of an automobile.

An illustrative embodiment of the present invention will be described with reference to the drawings. According to this illustrative embodiment, a lamp housing of a seamless rear combination lamp RCL of an automobile is an example of a resin molded product according to the present invention. FIG. 1 is a rear view of a right rear portion of an automobile CAR equipped with the rear combination lamp RCL. FIG. 1 shows an example in which the rear combination lamp RCL is disposed on the right rear portion of a vehicle body VB. A rear combination lamp is symmetrically disposed on the left rear portion, and the drawing thereof is omitted here.

The seamless lamps appear to be one integral lamp such that the boundary of the two independent lamps is inconspicuous when arranged adjacently. According to the illustrative embodiment, the rear combination lamp RCL includes an outside unit OSU disposed on the vehicle body VB at an outside in a vehicle width direction, and an inside unit ISU disposed on a rear trunk RT at an inside in the vehicle width direction. The outside unit OSU and the inside unit ISU are arranged close to each other in a left-right direction, so that the rear combination lamp RCL appears to be an integral one with two lamp units seamlessly connected together.

In this illustrative embodiment, the outside unit OSU includes an upper area configured by a tail lamp TL and a stop lamp SL shown by dashed lines, and a lower area configured by a turn signal lamp TSL. The inside unit ISU includes an upper area configured by a tail lamp TL and a stop lamp SL shown by dashed lines, and a lower area configured by a backup lamp BUL.

The rear combination lamp RCL is configured such that the lamp bodies at the portion where both the units OSU and ISU face each other are not exposed when viewed from the front, so that the boundary of the front covers at the portion where both the units OSU and ISU face each other is inconspicuous and appears continuous. Further, it is desirable that light emitted from each unit appears to be blended when both units are lit on.

For forming the lamp housing, a leg portion is provided to stand on the edge of the front cover, and the front cover is welded to the lamp body with this leg portion. In order to form a seamless structure, a leg wall is provided such that the height at the seamless portion is higher than at other portions, and an end surface of the leg wall is welded to the lamp body. That is, at the portion where both units face each other, a peripheral wall of each lamp body is replaced by a translucent leg wall, and the lamp body is not exposed from the front side of the lamp at this portion. Further, light can pass through the leg walls of both units mutually so as to achieve the seamless structure.

However, in such a combination lamp, the position of the welding portion of the leg wall is away from the surface of the front cover by the height of the leg wall. Therefore, as described above, it is difficult to use one galvano head to laser weld the entire welding portion, including the welding portion of the leg wall, on the periphery of the front cover.

Figure 2:
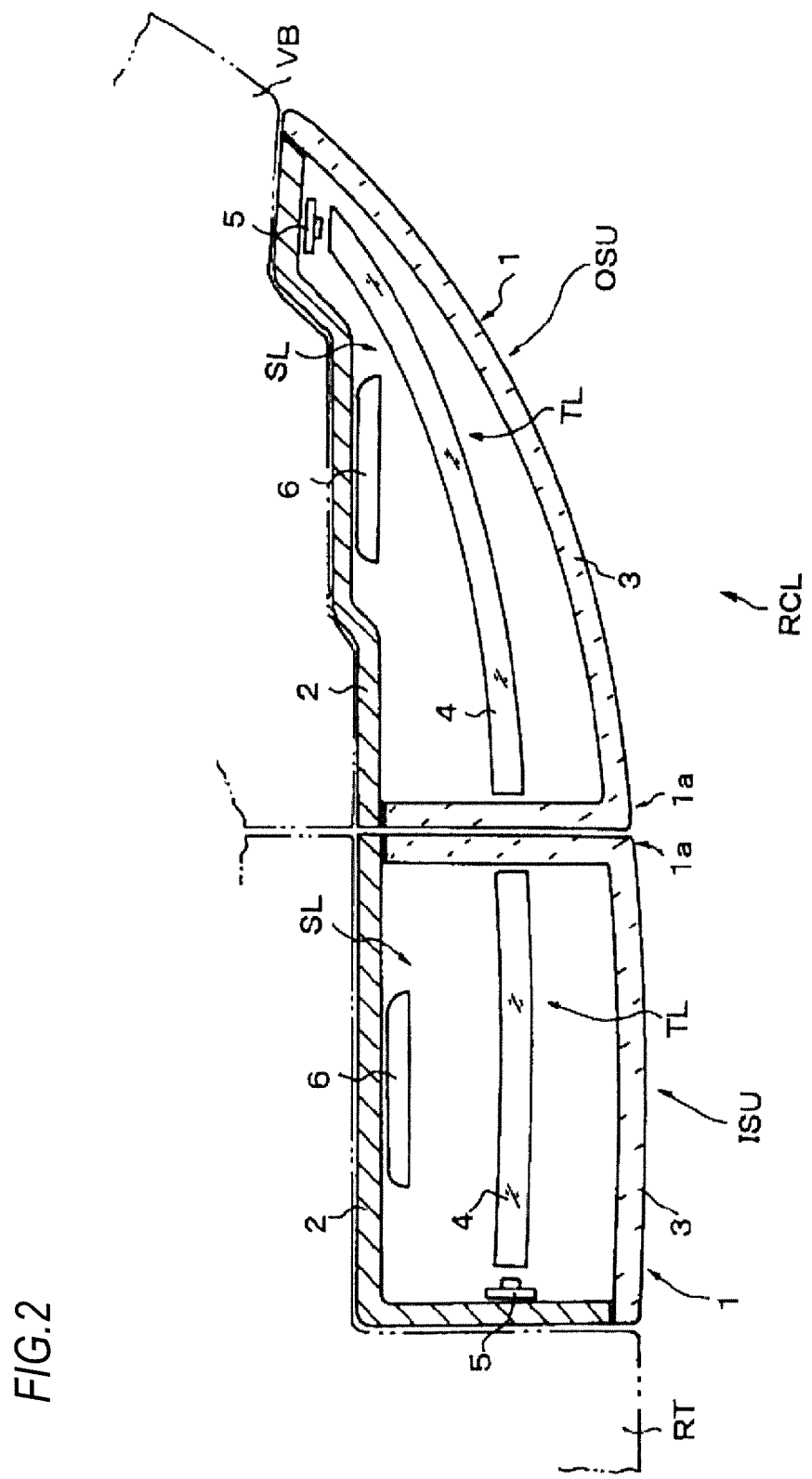
FIG. 2 is an enlarged sectional view along a line II-II of FIG. 1.

FIG. 2 is an enlarged sectional view along the line of FIG. 1. The outside unit OSU includes a lamp housing 1 which includes a container-shaped lamp body 2, a front side of which opens toward the rear of the automobile CAR, and a front cover 3 made of translucent resin and welded to the opening of the lamp body 2.

The lamp housing 1 is configured such that the surface of the front cover 3 is exposed at the edge 1a of the side facing the inside unit ISU arranged adjacently therewith and is optically coupled to the inside unit ISU at the edge 1a, as described below. Herein, the edge 1a of the side facing the inside unit ISU is referred to as a seamless portion.

Figure 3:
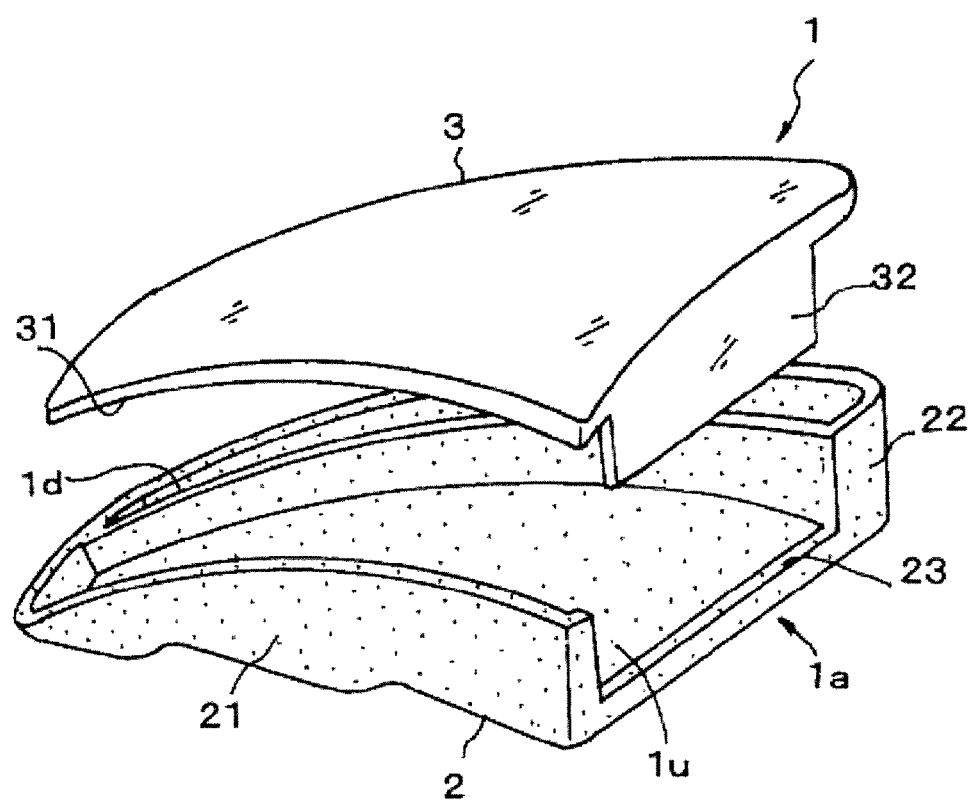
FIG. 3 is a schematic exploded perspective view of a lamp housing of an outside unit.

FIG. 3 is an exploded perspective view of the lamp body 2 and the front cover 3 of the lamp housing 1 of the outside unit OSU. The lamp body 2 is made of light absorbing resin, such as resin containing light absorbing materials such as carbon, which can be heated and melted by laser beams. The front cover 3 is made of transparent resin which transmits light and can be melted by the heat melting the lamp body 2. The lamp body 2 and the front cover 3 are welded to form the lamp housing 1 (described below).

The lamp body 2 is formed as a shallow plate-shaped container having a front opening and a peripheral wall 21 extending along the opening. A partition wall 22 is arranged to stand in the lamp body 2 to partition an upper room 1u for configuring the tail lamp TL and the stop lamp SL, and a lower room 1d for configuring the turn signal lamp TSL in the lamp housing 1. The seamless portion 1a has a cutout portion 23 by cutting a portion of the peripheral wall 21 at the inner side of the upper room 2a in the vehicle width direction. The upward end surface of the peripheral wall 21 in FIG. 3 and the edge of the cutout portion 23 respectively are configured as the welding portions for welding the front cover 3.

The front cover 3 is formed as a curved surface along a surface shape of the vehicle body VB of the automobile CAR, and a peripheral portion 31 of the inner surface of the front cover 3 is in close contact with the end surface of the peripheral wall 21 of the lamp body 2. In a portion corresponding to the seamless portion 1a, a leg wall 32 stands to extend backward (downward in FIG. 3) from the inner surface of the front cover 3. The leg wall 32 has the same shape as that of the cutout portion 23 on the lamp body 2. The leg portion may be provided on the peripheral portion 31 of the front cover 3 and welded to the peripheral wall 21 of the lamp body 2. In this case, the leg wall 32 stands to extend higher than the leg portion. The front cover 3 is formed with optical steps to obtain a predetermined light distribution by radiating and diffusing light emitted from a light source when the lamps are lit on, but the drawing and description thereof are omitted here.

The welding of the lamp body 2 and the front cover 3 will be described below. The peripheral portion 31 of the front cover 3 is in close contact with the end surface of the peripheral wall 21 of the lamp body 2, and the end surface of the leg wall 32 of the front cover 3 abuts against the inner surface of the cutout portion 23 of the lamp body 2 to be in close contact therewith. Then, the lamp housing 1 is formed by laser welding these closely contacted portions.

As shown in FIG. 2, in the lamp housing 1, the translucent leg wall 32 of the front cover 3 is provided at the seamless portion 1a instead of the peripheral wall 21 through which the light does not transmit, due to the cutout portion 23 on the lamp body 2. Therefore, the lamp housing 1 is configured to transmit light into and out of the seamless portion 1a of the lamp housing 1.

As shown in FIGS. 1 and 2, two rod-shaped light guide bodies 4 are arranged in parallel to extend along a horizontal direction in the upper room 1u of the lamp housing 1 of the outside unit OSU and are supported in the lamp body 2. Further, a tail light source 5, such as a red LED, is supported in the upper room 1u at a position facing an end surface of each light guide body 4. The light is emitted into the end surface of the light guide body 4 when the tail light source 5 is lit on (emitting light). The tail lamp TL includes these light guide bodies 4 and tail light sources 5. A stop light source 6 which emits red light with high luminosity is installed in the upper room 2a to configure the stop lamp SL.

A turn signal light source which emits amber light is disposed in the lower room 1d of the lamp housing of the outside unit OSU, but the drawing is omitted herein. Accordingly, the turn signal lamp TSL is configured in the lower room 1d.

As shown in the cross-sectional view of FIG. 2, the inside unit ISU has the same configuration as that of the outside unit OSU. Therefore, the same reference numerals are given to the equivalent portions of the outside unit OSU. The portion of the side facing the outside unit OSU configures the seamless portion 1a of the lamp housing 1 of the inside unit ISU.

Although the drawing is omitted, the inside of the lamp housing 1 of the inside unit ISU is also divided into an upper room and a lower room. A light guide body and a tail light source are installed in the upper room in the same manner as the outside unit OSU to configure the tail lamp TL as shown in FIG. 1. The stop light source is also installed to configure the stop lamp SL as shown in FIG. 1. A backup light source which emits white light is disposed in the lower room of the lamp housing 1 to configure the backup lamp BUL as shown in FIG. 1.

Since the outside unit OSU and the inside unit ISU are configured as described above, both units OSU and ISU are arranged to face each other in a state where the leg walls 32 of front covers 3 are close to each other when both units OSU and ISU are installed in the automobile CAR as shown in FIGS. 1 and 2. Accordingly, there is no peripheral wall 21 of the lamp body 2 in the boundary of the units OSU and ISU, i.e., the seamless portion 1a, so that the peripheral wall 21 is invisible through the front cover 3 and the leg wall 32 of the translucent front cover 3 is observable. Thus, external light reflected by the front covers 3 and the leg walls 32 of both units OSU and ISU is blended when the rear combination lamp RCL is lit off, so that the front covers 3 of both units OSU and ISU appear to be seamlessly connected, i.e., seamless lamps.

The light of the tail lamp TL and the stop lamp SL are mutually incident and emitted through the seamless portion 1a of both units, i.e., the leg walls 32 provided on the front covers 3 of the units OSU and ISU, when the tail lamp TL or the stop lamp SL of the inside unit ISU and the outside unit OSU is lit on. Therefore, the inside unit ISU and the outside unit OSU are optically coupled to each other to configure a seamless rear combination lamp.

That is, both tail light sources 5 of the outside unit OSU and the inside unit ISU emit light when the tail lamp TL is lit on. The red light from each tail light source 5 is incident to one end surface of the light guide body 4, is emitted from the side facing the front side of the lamp while being guided inside the light guide body, and is emitted to the outside through the front cover 3. Therefore, the tail lamp TL appears to be two line-shaped light emitting surfaces horizontally extending in upper and lower of the outside unit OSU and the inside unit ISU respectively when it is lit on.

At this time, the other end surface of each light guide body 4 of the units OSU and ISU extends to the seamless portion 1a where the light emitted from the other end surface of each light guide body 4 is separately incident on the opposite unit through the leg wall 32 of the front cover 3. Accordingly, the light is emitted forward as a whole from the seamless portion 1a through the front cover 3, and the light guide bodies 4 of both units OSU and ISU appear to be a continuous line-shaped light emitting surface in the seamless portion 1a.

Both the stop light sources 6 of the outside unit OSU and the inside unit ISU emit light when the stop lamp SL is lit on. Thus the entire upper room 1u of each lamp housing 1 of the units OSU and ISU turns on in red with high luminosity. In this case, the light is also emitted forward as a whole through the seamless portion 1a of the front cover 3 since the light inside the lamp housings 1 of the units OSU and ISU is incident on the opposite unit respectively through the leg wall 32 of the front cover 3. Therefore, the stop lamps SLs of the units OSU and ISU appear to be continuous light emitting surfaces.

An area corresponding to the lower room of the front cover 3 of the outside unit OSU emits amber light when the turn signal lamp TSL is lit on. An area corresponding to the lower room of the front cover 3 of the inside unit ISU emits white light when the backup lamp BUL is lit on. These lamps are lit on independently since no seamless portion is provided in the lower areas of the units OSU and ISU.

Figure 4:
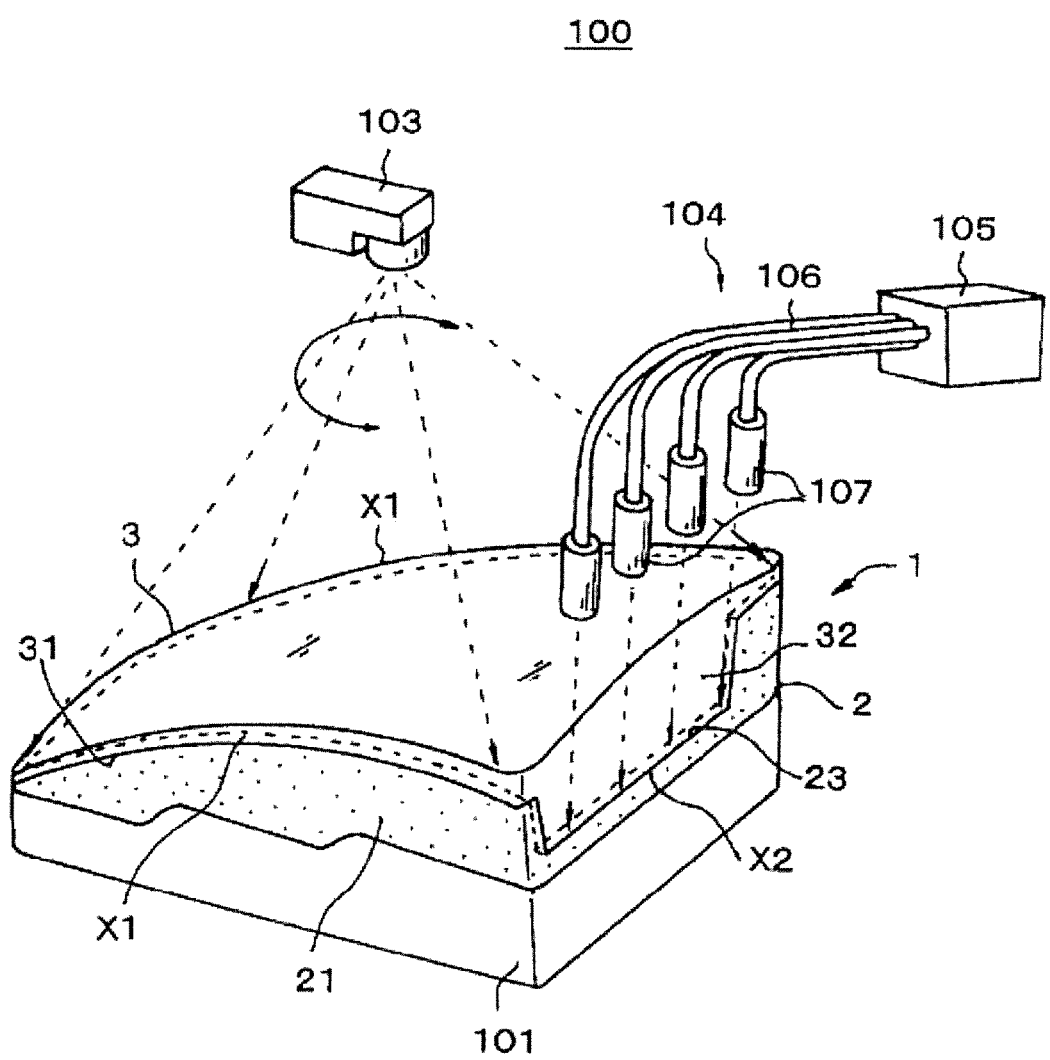
FIG. 4 is a perspective view showing a schematic configuration of a welding apparatus.

FIG. 4 is a perspective view showing a schematic configuration of a welding apparatus for welding the lamp housings 1 of the units OSU and ISU of the rear combination lamp RCL, i.e., the lamp housing 1 of the outside unit OSU herein. The welding apparatus 100 includes a base 101, on which the lamp body 2 is mounted with its opening facing upward and the front cover 3 is mounted thereon while being positioned. Further, the welding apparatus 100 includes a pressing mechanism (not shown) which presses the front cover 3 downward such that the inner surface side of the front cover 3 contacts the upward surface of the lamp body 2. Accordingly, the peripheral portion 31 of the front cover 3 becomes close contact with the end surface of the peripheral wall 21 of the lamp body 2, and the end surface of the leg wall 32 of the front cover 3 also becomes close contact with the inner surface of the cutout portion 23 of the lamp body 2.

The welding apparatus 100 includes a galvano laser projection unit 103 disposed over the base 101 and a flash laser projection unit 104 disposed on one side of the base 101.

The galvano laser projection unit 103 simply uses the known laser projection apparatus, so the drawing and detailed description are omitted. The galvano laser projection unit 103 includes a laser light source (laser oscillator) and a galvano mirror which is configured to deflection-control the projection direction of laser beams from the laser light source and is configured to project laser beams to scan at a high speed the portion where the lamp body 2 is in close contact with the front cover 3 except for the seamless portion 1a.

The flash laser projection unit 104 includes a laser light source 105, a plurality of optical fibers 106 optically coupled to the laser light source 105 at one end, and projection heads 107 connected to the other ends of the optical fibers 106, respectively. The flash laser projection unit 104 is configured such that light from the laser light source 105 is incident on one end of the optical fiber 106 and guided in the optical fiber 106 to the other end such that the light is projected while being focused or radiated by the projection head 107. The projection head 107 includes an optical system such as lens for focusing or radiating light from the optical fiber 106 in its original circular beam shape, but the description is omitted here.

The flash laser projection unit 104 includes one or more projection heads 107. Four projection heads 107 are shown in order to simplify the illustration. The flash laser projection unit 104 is disposed to face the seamless portion 1a of the lamp housing 1 and projects laser beams from each projection head 107 onto the area where the leg wall 32 of the front cover 3 is formed.

Incidentally, the four projection heads 107 of the flash laser projection unit 104 may be configured as four flash laser projection units with independent laser light sources. In the present illustrative embodiment, as described above, one flash laser projection unit 104 includes one laser light source 105 for the four projection heads 107.

Figure 5:
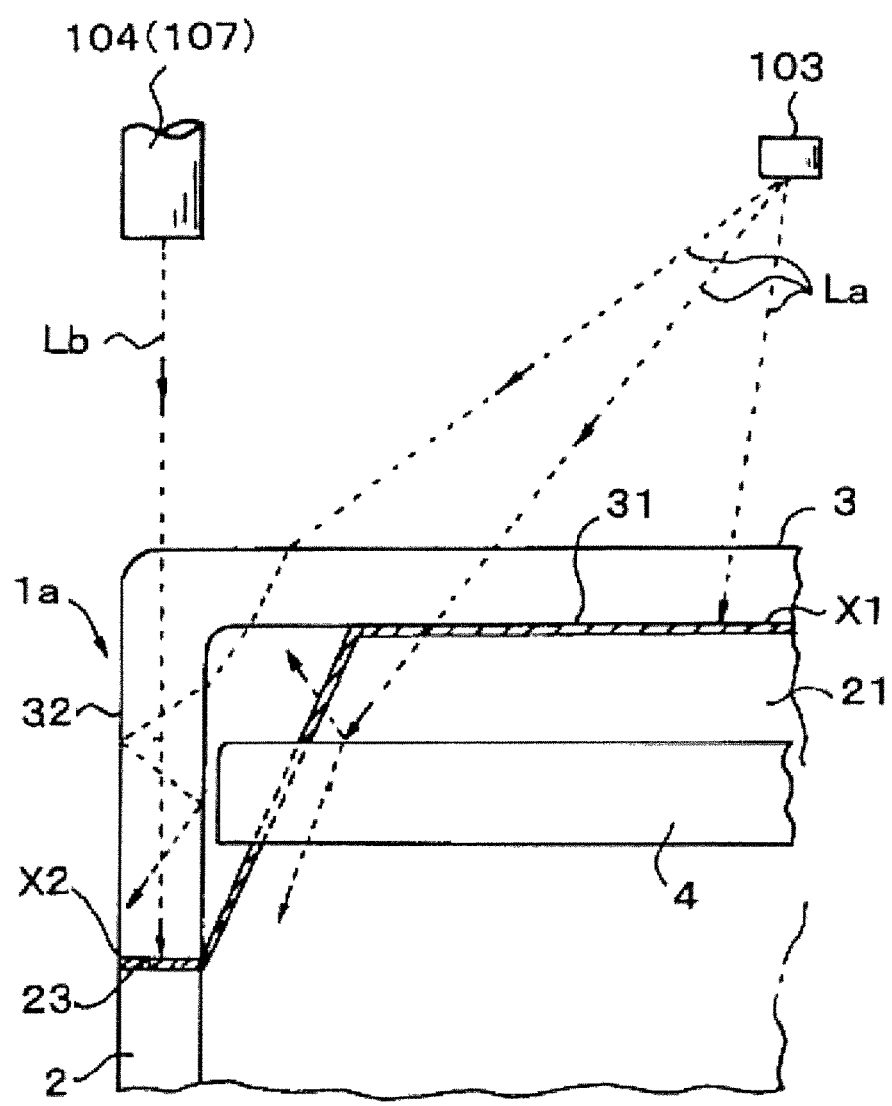
FIG. 5 is a schematic sectional view showing a projection state of laser lights.

In the welding apparatus 100, the front cover 3 is mounted and positioned on the lamp body 2 placed on the base 101 and is in close contact with the lamp body 2 by the pressing mechanism (not described). Then, the galvano laser projection unit 103 performs scanning to project laser beams to the portion except for the seamless portion 1a. FIG. 5 schematically shows a projection state of laser lights. The projected laser beams La are incident on the front cover 3 and passes the front cover 3 along the thickness direction to be projected onto a portion where the peripheral portion 31 on the inner surface of the front cover 3 is in close contact with the end surface of the peripheral wall 21 of the lamp body 2, i.e., a first welding portion X1, so as to perform welding.

In this welding, if the laser beams La were scanned by the galvano laser projection unit 103 toward the portion where the leg wall 32 of the front cover 3 is in close contact with the cutout portion 23 of the lamp body 2, i.e., a second welding portion X2, it should be difficult to perform suitable welding since the laser beams La would be not effectively projected to the second welding portion X2. That is, as shown in FIG. 5, the laser beams La would not be projected onto the second welding part X2 even if the second welding part X2 were scanned toward the second welding part X2 since some of the laser beams La would be reflected by the surface of the front cover 3, while the rest of the laser beams La passing through the front cover 3 would be blocked by the light guide body 4 or the laser beams La entering the light guide body 4 would be refracted and reflected. Further, even if the laser beams La were not obstructed by the light guide body 4, the laser beams La would not be projected onto the second welding portion X2 since they are reflected or refracted by the leg wall 32. Some of the laser beams La might be guided from the front cover 3 to the leg wall 32 and be projected onto the second welding portion X2 after being reflected by the inner surface of the leg wall 32, but it should be difficult to ensure the light intensity necessary for welding.

In the illustrative embodiment of the present invention, the laser beams Lb are separately projected onto the seamless portion 1a from the four projection heads 107 of the flash laser projection unit 104 in parallel with the projection of the laser beams by the galvano laser projection unit 103. As shown in FIG. 5, the laser beams Lb from the four projection heads 107 are incident on the leg wall 32 through the front surface of the front cover 3, are substantially linearly guided inside the leg wall 32, and are projected onto the second welding portion X2 on which the end surface of the leg wall 32 is in close contact with the cutout portion 23 of the lamp body 2. Since the laser beams Lb are projected onto a plurality of areas which are spaced at predetermined interval in the length direction of the leg wall 32, the projection areas, on which the laser beams Lb are projected, are across the entire leg wall 32, so that the second welding portion X2 is suitably welded.

In this way, since the laser beams La emitted from the galvano laser projection unit 103 are effectively projected onto the first welding portion X1 through the front cover 3, high quality welding can be performed on the first welding portion X1 except for the seamless portion 1a of the welding portions on which the front cover 3 and the lamp body 2 are welded. Further, since laser beams Lb linearly incident from the four projection heads 107 of the flash laser projection unit 14 are projected onto the second welding portion X2 through the leg wall 32, high quality welding can be achieved on the second welding portion X2 using the laser beam energy with less attenuation.

In the welding apparatus 100, since the first welding portion extending across a wide area of the front cover 3 is welded by the galvano laser projection unit 103, welding can be performed taking advantage of the rapidity of the galvano laser projection unit 103. In addition, since the second welding portion X2, which is difficult for the galvano laser projection unit 103 to weld, is welded by the flash laser projection unit 104, welding can be performed taking advantage of high quality of the flash laser projection unit 104. Therefore, compared to welding the entire welding portion by the flash laser projection unit 104, the number of the flash laser projection units 104 or the projection heads 107 can be limited to a necessary minimum, so that the cost of the welding apparatus 100 can be reduced.

The flash laser projection unit 104 is not limited to having four projection heads, and the number of projection heads may be designed according to the relationship between the diameter of the laser beams Lb and the length of the second welding portion X2 so as to suitably perform welding the welding portion. In a case where one flash laser projection unit includes one projection head, the number of the flash laser projection units may be provided by the same number as the number of the above projection heads.

Figure 6A:
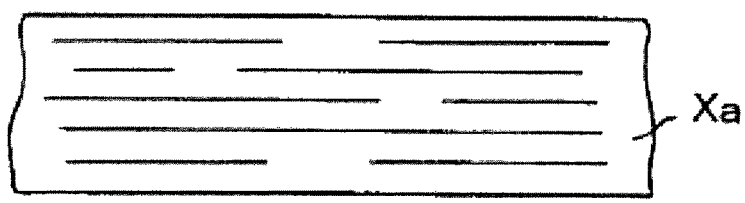
FIGS. 6A to 6C schematically show appearances of welded portions by laser welding of galvano method, flash method and scanning method, respectively.
Figure 6B:
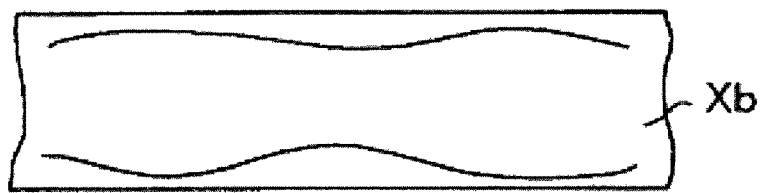

Herein, FIG. 6A schematically shows a welding appearance (magnified by a microscope or the like) by the laser welding of galvano method. The welding portion is repeatedly scanned by laser beams of micro-diameter and welded by the laser welding of galvano method, so that a welding portion Xa with linear welding traces along the scanning direction is formed. As shown in FIG. 6B, the flash laser projection unit 104 performs welding by projecting circular or almost circular laser beams onto the welding portion, so that a semicircular uneven welding portion Xb, on which a plurality of welding portions are connected, is formed on the welding area. Therefore, a welding portion welded by the laser welding of galvano method can be distinguished from a welding portion welded by the laser welding of flash method by checking the welding portion appearance.

Figure 6C:
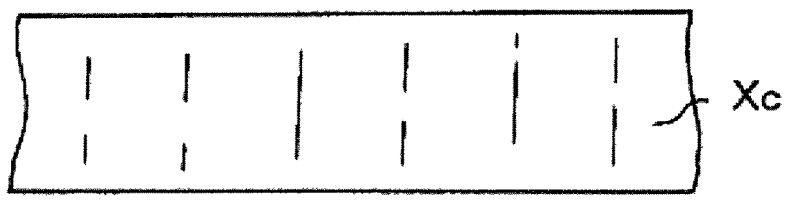

In the present invention, the flash laser projection unit 104 of the welding apparatus 100 may be replaced by a scanning laser projection unit. The laser welding of scanning method may be not suitable for a large or long welding portion as described above but suitable for the second welding portion of the seamless portion. As shown in FIG. 6C, a welding portion Xc is formed which has traces based on a welding time difference along the scanning direction, so that it is possible to determine a welding portion welded by the laser welding of scanning method.

Figure 7A:
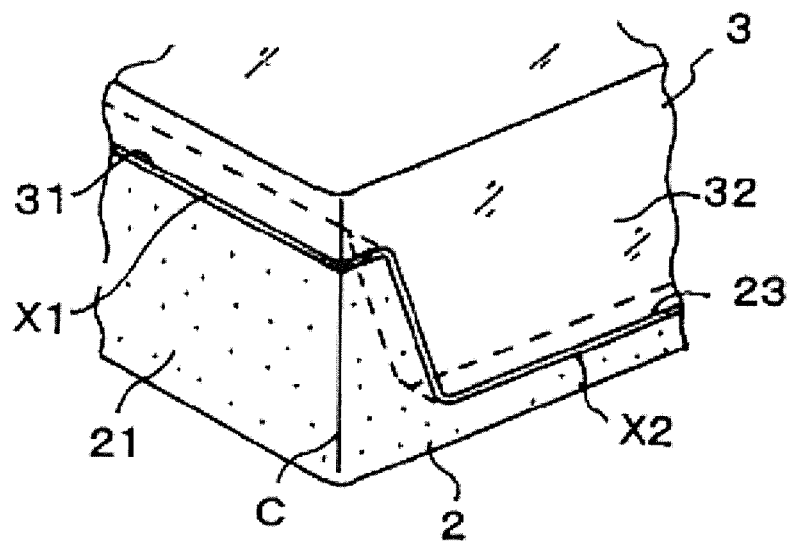
FIG. 7A is a schematic perspective view showing an overlapping portion of a welding portion.

In the illustrative embodiment of the present invention, at the boundary of the first welding portion X1 and the second welding portion X2, each welding area may be set to have an overlapping portion X3, on which both the laser welding of galvano method and the laser welding of flash method are performed. For example, as shown in FIG. 7A, when there is a corner portion C (a portion of the front cover 3 which is substantially rectangular when viewed from the front) of the front cover 3, it is designed such that the boundary of the first welding portion X1, on which the peripheral portion 31 of the inner surface of the front cover 3 and the peripheral wall 21 of the lamp body 2 are welded, and the second welding portion X2, on which the leg wall 32 and the cutout portion 23 of the lamp body 2 are welded, is located at the corner portion C.

Figure 7B:
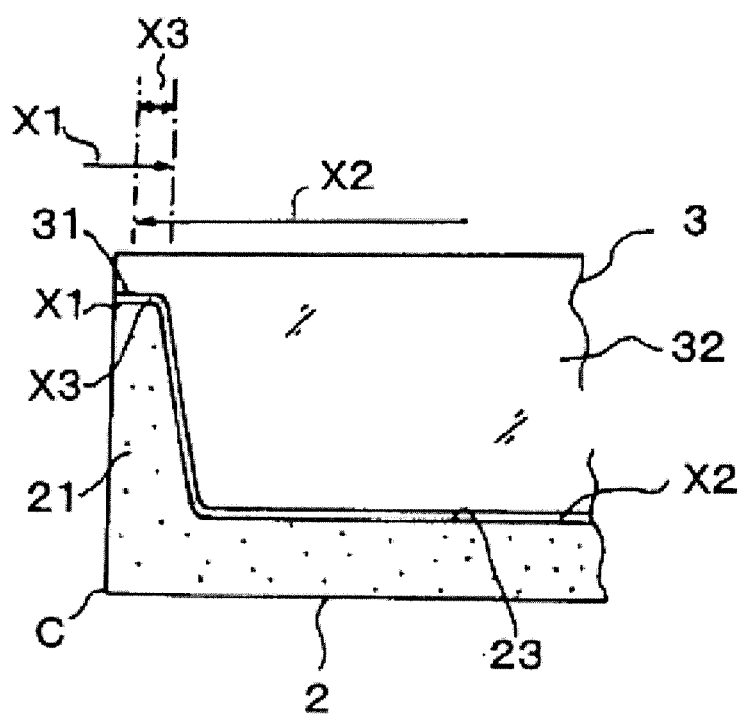
FIG. 7B is a front view thereof.

As shown in FIG. 7B, both the laser welding of galvano method and the laser welding of flash method are performed on the boundary of the first welding portion X1 and the second welding portion X2, i.e., the corner portion C such that the welding overlapping portion X3 is formed. Accordingly, an unwelded portion on the boundary of the first welding portion X1 and the second welding portion X2 may be avoided. Even if there is a difference in appearance between the overlapping portion X3 and the first welding portion X1 or the second welding portion X2, it is inconspicuous in the lamp appearance because the difference occurs on the corner portion C.

In the above illustrative embodiment, the present invention is applied to an automobile seamless rear combination lamp in which a plurality of lamps are integrated, but not limited to the lamps described in the illustrative embodiment. It can be applied to a case where at least two lamps are formed as a seamless lamp.

Further, the present invention is not limited to lamps of vehicles including automobiles, and can be applied to a lamp which includes a housing formed by laser welding a lamp body and a front cover, in particular, to a lamp having leg portions at the edge of the front cover with different heights.

Further, the present invention is not limited to lamps, and can be applied to a resin molded product formed by laser welding at least two members.

What is claimed is:

1. A resin molded product comprising:
a first member; and
a second member that is laser welded to the first member at a laser welded portion therebetween,
wherein the laser welded portion includes:
a first welding portion formed by laser welding using a galvano method, and
a second welding portion formed by laser welding using a flash method or a scanning method,
wherein the flash method comprises emitting a laser beam from each of a plurality of laser heads arranged along a welding surface onto the second welding portion,
wherein the scanning method comprises emitting a laser beam from a laser head that moves along the second welding portion,
wherein the second member comprises:
a translucent member including:
a first leg portion having a first height, and
a second leg portion having a second height that is greater than the first height,
wherein the first welding portion is provided on the first leg portion,
wherein the second welding portion is provided on the second leg portion,
wherein the first member is a lamp body,
wherein the second member is a translucent front cover welded to an opening of the lamp body at the laser welded portion, and
wherein the front cover comprises first and second leg portions that are disposed at a periphery of the front cover, and that are welded to the lamp body,
the resin molded product further comprising:
another lamp body arranged adjacently to the lamp body, and
another translucent front cover that is arranged adjacently to the front cover, and that is laser welded to another opening of the another lamp body at another laser welded portion therebetween,
wherein the another laser welded portion includes:
a third welding portion formed by laser welding using the galvano method, and
a fourth welding portion formed by laser welding using the flash method or the scanning method,
wherein the another front cover comprises third and fourth leg portions that are disposed at a periphery of the another front cover, and that are welded to the lamp body, and
wherein the second leg portion faces the fourth leg portion, and has a height greater than the first leg portion.

2. The resin molded product according to claim 1,
wherein an overlapping portion disposed at a boundary between the first welding portion and the second welding portion is formed by laser welding using the galvano method and either the flash method or the scanning method.

3. A resin molded product comprising:
a light absorbing lamp body; and
a translucent cover that is laser welded to the light absorbing lamp body at first and second welding portions therebetween,
wherein the translucent cover comprises:
a first leg portion of a leg wall at an outer periphery of the translucent cover protruding in a thickness direction of the translucent cover and having a first height in the thickness direction, and
a second leg portion of the leg wall at the outer periphery protruding in the thickness direction and having a second height in the thickness direction,
wherein the second height is greater than the first height,
wherein a first welding portion provided on the first leg portion is formed by laser welding using a galvano method,
wherein a second welding portion provided on the second leg portion is formed by laser welding using a flash method or a scanning method,
wherein the flash method comprises emitting a laser beam from each of a plurality of laser heads arranged along a welding surface onto the second welding portion, and
wherein the scanning method comprises emitting a laser beam from a laser head that moves along the second welding portion, wherein the first member is a lamp body, wherein the second member is a translucent front cover welded to an opening of the lamp body at the laser welded portion, and wherein the front cover comprises first and second leg portions that are disposed at a periphery of the front cover, and that are welded to the lamp body, the resin molded product further comprising:

another lamp body arranged adjacently to the lamp body, and another translucent front cover that is arranged adjacently to the front cover, and that is laser welded to another opening of the another lamp body at another laser welded portion therebetween, wherein the another laser welded portion includes:
- a third welding portion formed by laser welding using the galvano method, and
- a fourth welding portion formed by laser welding using the flash method or the scanning method, wherein the another front cover comprises third and fourth leg portions that are disposed at a periphery of the another front cover, and that are welded to the lamp body, and wherein the second leg portion faces the fourth leg portion, and has a height greater than the first leg portion.

4. The resin molded product according to claim 1, wherein the second member is formed as a curved surface along a shape of a vehicle body.

5. The resin molded product according to claim 3, wherein the translucent cover is formed as a curved surface along a surface shape of a vehicle body.

6. The resin molded product according to claim 1, wherein the second leg portion extends in the direction of a vehicle body.

7. The resin molded product according to claim 3, wherein the second leg portion extends in the direction of a vehicle body.

* * * * *